July 15, 1924.
T. KUGLER ET AL
1,501,786
CONVERTIBLE VEHICLE BODY
Filed April 17, 1922    2 Sheets-Sheet 2
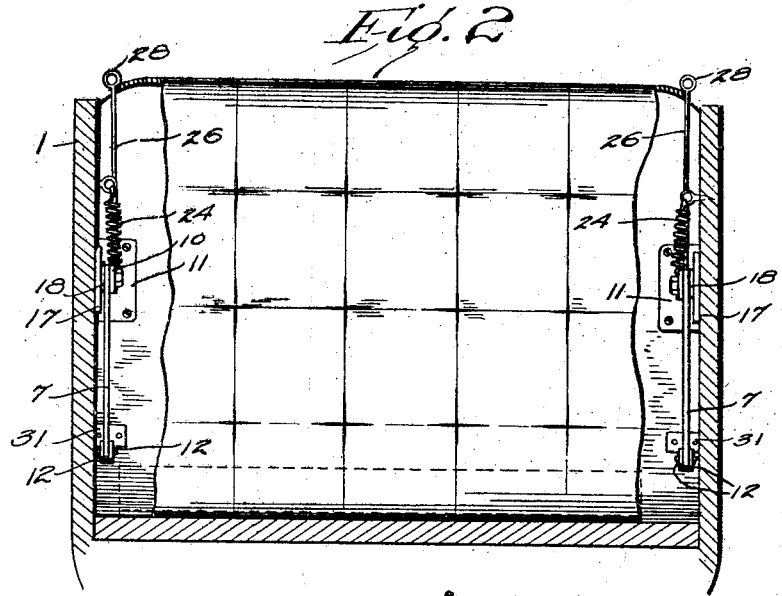
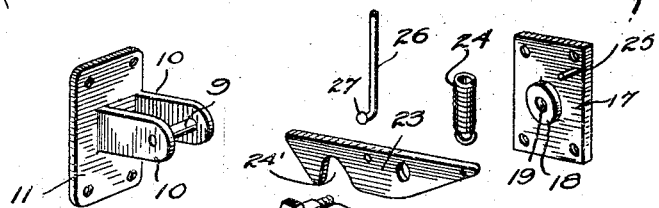
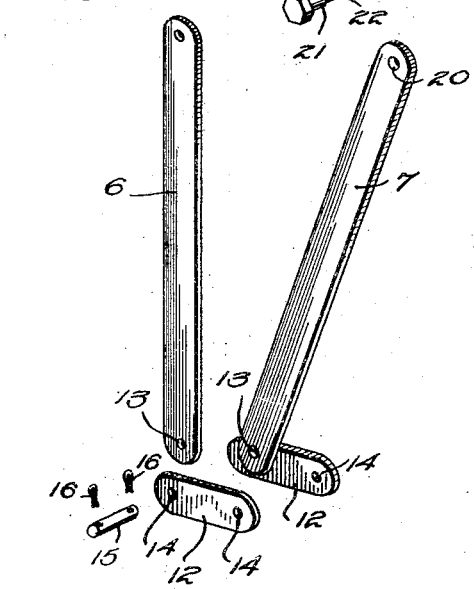
Inventor
THEODORE KUGLER
FRANK L. VAN ROSSUM
By D. V. Mahoney
Attorney Patented July 15, 1924.

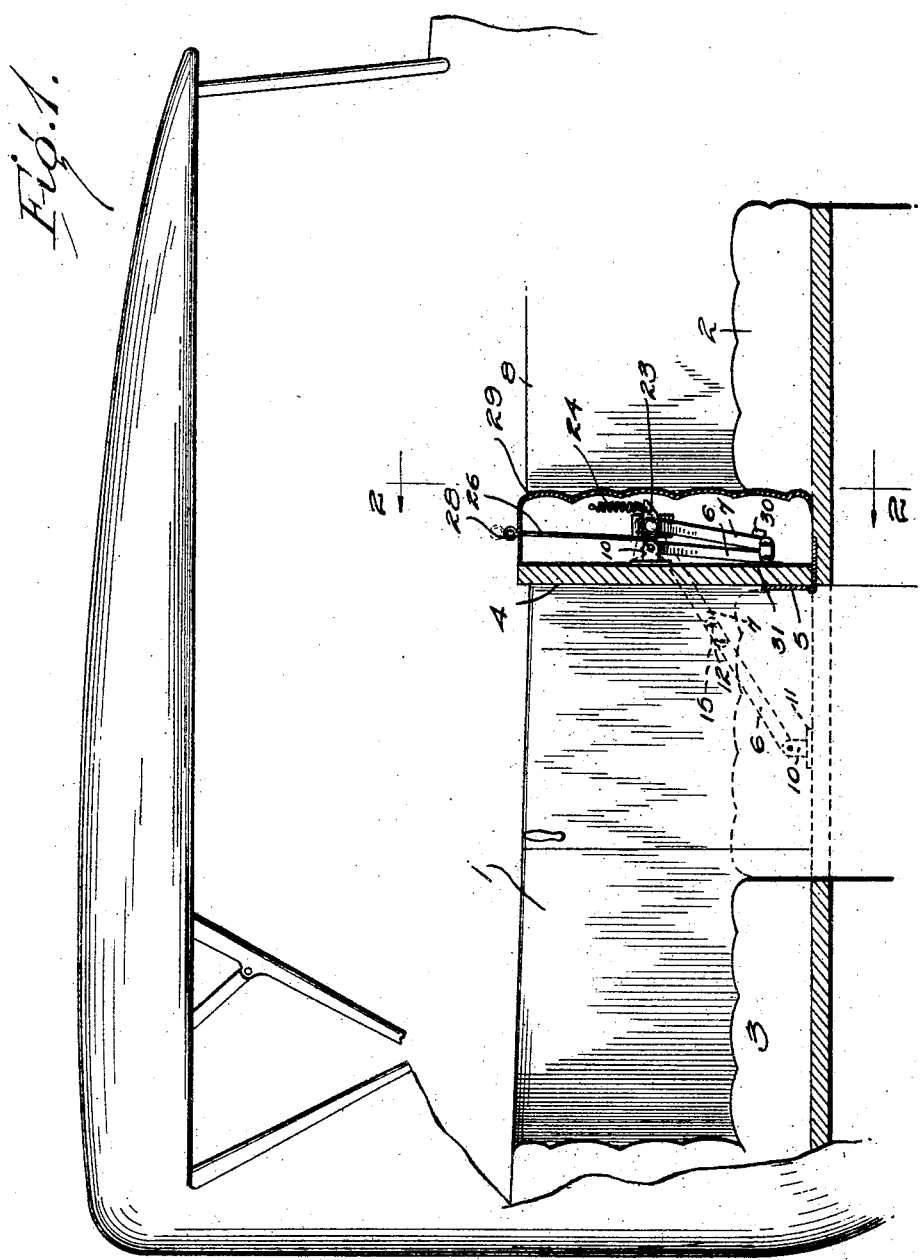

1,501,786

UNITED STATES PATENT OFFICE.

THEODORE KUGLER AND FRANK L. VAN ROSSUM, OF APPLETON, WISCONSIN.

CONVERTIBLE VEHICLE BODY.

Application filed April 17, 1922. Serial No. 553,786.

*To all whom it may concern:*

Be it known that we, THEODORE KUGLER and FRANK L. VAN ROSSUM, citizens of the United States, residing at Appleton, in the county of Outagamie and State of Wisconsin, have invented certain new and useful Improvements in Convertible Vehicle Bodies, of which the following is a specification.

This invention relates to vehicle bodies, and more particularly to convertible vehicle bodies.

One object of the invention is the provision of a vehicle body which may be converted into a bed when desired.

A further object is the provision of a convertible automobile body in which the front of the back seat is lowered to bridge the space between the front seat and the back seat.

A further object is the provision of means for supporting the back in either position, which means are arranged beneath the cushions and hidden from view.

A further object is the provision of a hinged back which may be lowered by releasing a locking member and which will automatically lock in normal position when raised.

With these and such other objects in view as will be apparent from the description, our invention resides in the novel combination, construction and arrangement of parts hereinafter described and claimed, and illustrated in the accompanying drawings, of which—

Figure 1 is a side elevation of the body of a vehicle, partly in section, showing the invention applied;

Figure 2 is a transverse vertical, sectional view on the line 2—2 of Figure 1; and Figure 3 is a detail, unassembled view of the parts for hinging the back of the front seat.

Referring to the drawings, the reference numeral 1 designates the body of a motor vehicle, as a whole. The vehicle is provided with a front seat 2 and a rear seat 3. The front seat is provided with a back 4. It is the usual construction to provide a rigid back for the front seat, but in the present construction the back is connected to the seat by means of hinges 5 to permit it to be lowered to the position shown in Figure 1 of the drawings, and bridge the space between the front and back seats.

In order to retain the back in horizontal position and prevent sagging means are provided consisting of a pair of arms 6 and 7, which are pivoted to the back 5 and to the side 8 of the vehicle body. These arms are connected to each other to permit their extension, thus forming a brace extending from the lowered portion to the side of the car, and supporting it. Two of these braces may be employed, one at each side of the car, as shown in Figure 2 of the drawings.

The arm 6 is connected to a pin 9 carried between a pair of ears 10, formed on a plate 11. This plate may be secured to the back by any suitable type of fastening elements. The opposite end of the arm is connected to the arm 7 by a link. As shown, the link is formed of a pair of plates 12 arranged on opposite sides of the arms. These plates may be connected to the arms in any suitable manner. In the embodiment shown, the ends of the arms are provided with openings 13. The plates are provided with openings 14 adjacent each end. The openings 14 are adapted to be arranged in alignment with one of the openings 13, and a pin 15 passed through them. The pin may be held in position by any suitable means, such as cotter pins 16.

As stated, the other end of the arm 17 is pivotally connected to the side of the car. A plate 17 is secured to the side 8 and this plate is provided with an enlargement or thickened portion 18, having a threaded opening 19. The end of arm 3 is provided with an opening 20, adapted to receive a pin 21. This pin is provided with a threaded end 22 adapted to be received in the threaded opening 19. It will be apparent that the arms 6 and 7, when extended, form a brace or support for the back when it is in horizontal position and that they may be folded in the position shown in Figure 1 when the back is in normal position.

Suitable means are provided for retaining the back in normal position. As shown a locking member 23 is pivotally mounted on the pin 21. This member is provided with a recess 24' adapted to receive the pin 9 when the back is in normal position. The locking member is maintained in operative position by means of a spring 24 secured to the rear end thereof, and to the side of the car. The plate 17 may be provided with a stop to limit the downward movement of the forward end of the locking member. The locking member is released to lower the back, by means of a rod 26. The lower end of this rod is offset as at 27 and secured to the locking member, and the upper end is arranged above the top of the back and provided with a ring 28. It will be noted that the operating parts of the back control are arranged behind the cushion 29, and the ring 28 is the only part projecting beyond the cushion. If desired, a bumper 30 may be arranged on the side of the car adjacent the lower end of arm 7 when it is in folded position, and a similar bumper 31 may be arranged on the back.

The operation of the device will be apparent. When the back is to be lowered, the rod 26 is raised to release the locking member 23 from the pin 9. The back is then lowered and the arms 6 and 7 extended to form, in effect, a continuous supporting member or brace, to retain the back in horizontal position, bridging the space between the front and back seats. As the seats are provided with cushions, and the back is provided with a cushion 28, the body is thus converted into a bed. Spring 24 normally holds the locking member in position to engage the pin 9 when the back is raised and thus lock the parts in normal position.

The bumpers 30 and 31 prevent the parts from rattling due to the vibration of the vehicle in running.

It will be noted that the back may be retained in normal position or lowered, and that the operating means is entirely hidden by the cushions with the exception of ring 28. When the back is raised, the locking member automatically snaps into position, and it may be released by merely lifting pin 28.

We claim:

A convertible vehicle body comprising a front seat, a rear seat spaced therefrom, a back hinged to said front seat and adapted to bridge the space between said seats when lowered, cushions arranged on said front and rear seats and said back, a foldable arm to support said back in lowered position, said arm being normally disposed in a plane between the back and the front face of said back cushion, one end of said arm being secured to the side of said body, a bracket secured to said back, a pin carried by said bracket, the other end of said arm being pivotally supported on said pin, a locking member secured to said body, said locking member being adapted to engage said pin, and an operating member connected thereto and projecting slightly beyond the upper edge of said back.

In testimony whereof we affix our signatures.

THEODORE KUGLER.
FRANK L. VAN ROSSUM.